Aug. 24, 1965 L. W. DINKIN 3,202,375

SELF-THREADING TAPE RECORDING REEL

Filed March 23 1964

INVENTOR.
LEON W. DINKIN
BY Joseph F. Cole
ATTORNEY

United States Patent Office 3,202,375
Patented Aug. 24, 1965

3,202,375
SELF-THREADING TAPE RECORDING REEL

Leon W. Dinkin, 100 Font Blvd., San Francisco, Calif.

Filed Mar. 23, 1964, Ser. No. 353,787
7 Claims. (Cl. 242—74)

The present invention relates to improvements in a self-threading tape recording reel. It consists of the combinations, constructions, and arrangement of parts, as hereinafter described and claimed.

In conventional tape recorders, reels are provided upon which recording tapes are wound. However, much difficulty is experienced in anchoring the free ends of the tapes to the reels. The latter are usually formed with peripheral notches in the hubs of the reels and into which the free ends of the tapes must be inserted and anchored.

As the cardinal object of this invention, it is proposed to provide a self-threading recording reel on which a recording tape of ferrous oxide material may be wound, the hub of the reel having a permanent magnet band secured thereto so that the free end of the tape may be attracted to and anchored by the magnetic field. It is only necessary to bring the free end of the recording tape in proximity with the magnet in order to effect an anchorage of the tape to the reel.

Another object of the invention is to provide a protective shield over the magnetic band to protect impressions on the tape from distortion or erasure by the magnetic band, this shield being made from a substance so that the magnetic field was pass therethrough.

A still further object of the invention is to provide a kit with parts for modifying conventional reels so that the magnetic band and the protective shield may be readily applied to such reels. However, the magnetic band and the protective shield may be applied to the reel at the factory, if desired.

Another object of the invention is to provide a self-threading tape recording reel in which the magnetic band and the shield are substantially balanced around the circumference of the hub to thus avoid vibrations when the reel is turned about its axis of rotation.

Other objects and advantages will appear as the specification proceeds. The novel features of the invention will be pointed out in the appended claims.

*Drawing*

For a better understanding of the invention, reference should be had to the accompanying drawing, forming part of this specification, in which.

Figures 1, 2, 3, 4, 5:
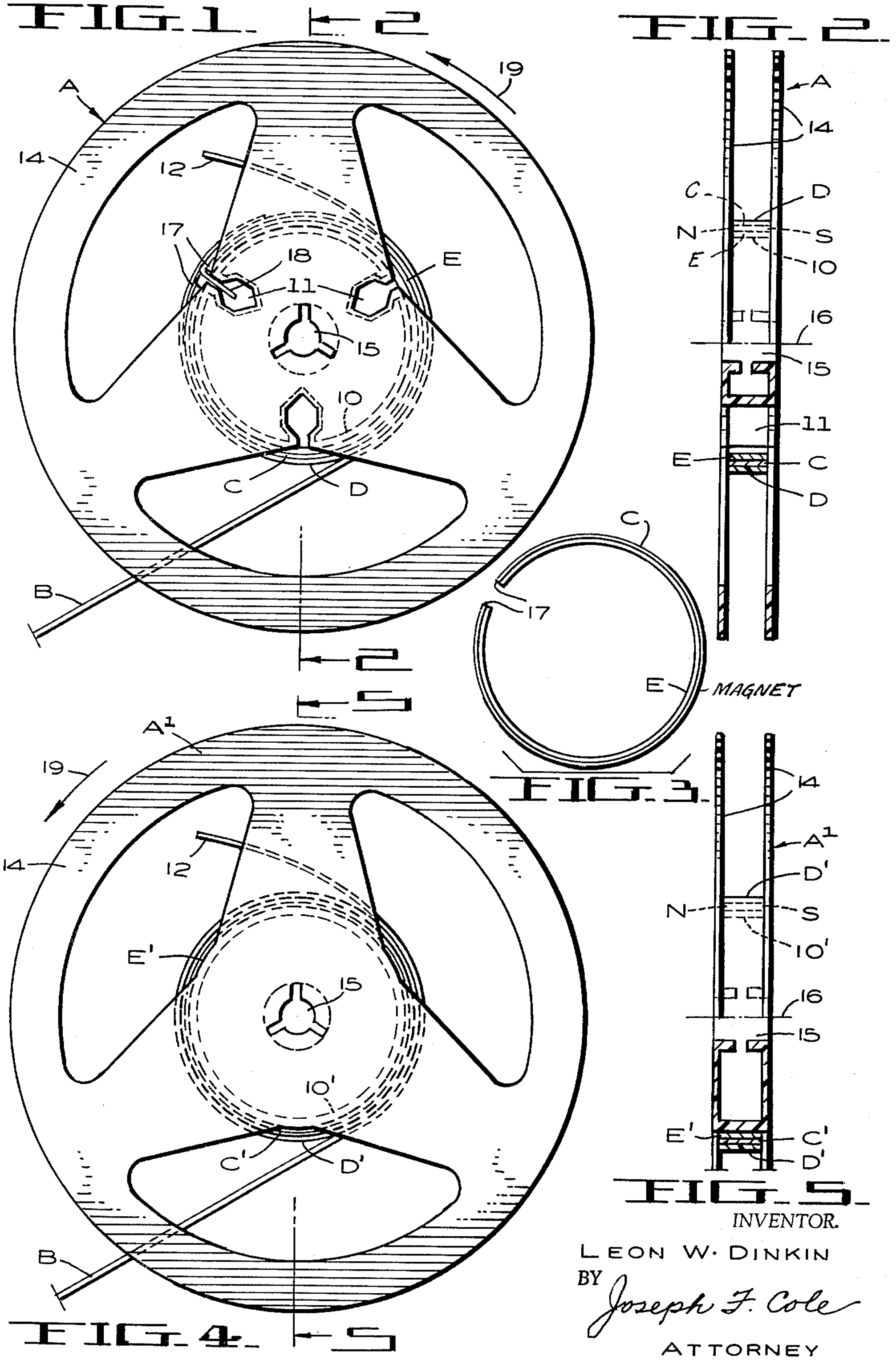
FIGURE 1 is a plan view of a conventional tape recording reel that has been modified to provide a self-threading tape recording reel.
FIGURE 2 is a vertical sectional view taken along the line 2—2 of FIGURE 1.
FIGURE 3 is a top plan view of the permanent magnet band and an armature disclosed in FIGURE 1.
FIGURE 4 is a plan view of a further embodiment of a self-threading tape recording reel.
FIGURE 5 is a vertical sectional view taken along the line 5—5 of FIGURE 4.

While I have shown only the preferred forms of my invention, it should be understood that various changes, or modifications, may be made within the scope of the annexed claims without departing from the spirit thereof.

*Detailed description*

Referring now to the first embodiment of the invention, as disclosed in FIGURES 1 to 3, inclusive, I have shown a conventional reel A having a hub 10 on which a recording tape B of ferrous oxide material may be wound. This hub is usually formed with peripheral notches 11 into which the free end 12 of the tape must be inserted with difficulty, since the reel has spaced parallel flanges 14 between which the tape must be inserted, these flanges being fashioned integral with the hub 10.

The reel A is made from non-magnetic material, such as a suitable plastic, and the reel is provided with an opening 15 at its center to receive the usual rotatable spindle of a tape recorder, with the reel A being turned about the axis of rotation 16.

In FIGURES 1, 2 and 3, I illustrate a permanent magnet band C that is secured to the hub 10 of the reel A, and a protective shield D is mounted over and covers the magnetic band C to protect impressions on the tape B from distortion or erasure by the magnetic band. This shield is made from a substance so that the magnetic field will pass therethrough to thus attract and anchor the free end 12 of the recording tape B to the hub 10, when this free end is brought into the magnetic field. The shield D may be vinyl, acetate or similar plastic. The poles of the magnetic band are located at its lateral sides, as indicated by "N" and "S" in FIGURE 2.

The magnetic band C and the protective shield D are flexible so that they will conform to the diameter of the hub 10 when applied thereto. As clearly shown in FIGURES 1 and 3, the ends 17 of the magnetic band C are spaced apart, leaving one of the peripheral notches 11 uncovered by the magnetic band. The shield strip D has its inner end 18 extending through the space between the ends 17 of the magnetic band C and being anchored in the selected peripheral notch 11 of the hub. This shield has sufficient length to provide at least one convolution extending entirely around the hub 10.

It will be noted that an armature E made of a thin strip of iron or steel may be interposed between hub 10 and the magnetic band C to give better magnetic attraction.

As an important structural feature, the magnetic band C and the protective shield D are substantially balanced around the circumference of the hub 10 to thus avoid vibration when the reel A is turned about its axis of rotation 16.

In view of the foregoing, it will be apparent that a kit may be provided with the permanent magnet band C, the protective shield D and the armature E so that a conventional tape recorder reel A may be modified by an individual to provide the self-threading tape recorder reel.

Referring now to the modified tape recorder reel $A^1$ disclosed in FIGURES 4 and 5 of the drawing, this type of reel could be produced in the factory. In this embodiment, the hub 10' is not provided with peripheral notches, as in FIGURE 1, but the reel $A^1$ does have side flanges 14, the central spindle-receiving opening 15, and the recording tape B may be wound on the hub 10'.

In this second embodiment (FIGURES 4 and 5), the permanent magnet band C' is secured to the hub 10' to extend entirely therearound. Likewise the protective shield D' and the armature E' extend entirely around the hub 10' of the reel $A^1$. In all other respects, the self-threading tape recording reel $A^1$ is identical with the reel A previously described.

The protective shield D' could be formed as a part of the reel $A^1$, if desired, with an annular slot to receive the magnetic band C' and armature E'.

In either embodiment of the reel, the armature E or E' could be omitted, if desired. The reels turn in the direction of the arrows 19 when the recording tapes are being wound thereon.

I claim:

1. In combination, a magnetic sound recording tape of ferrous oxide material, and a self-threading tape recording reel, the latter comprising:

(a) a reel having a hub on which the sound recording tape may be wound;

(b) a permanent magnet band secured to the hub of the reel;
(c) and a protective shield mounted over and covering the magnetic band to protect impressions on the tape from distortion of erasure by the magnetic band;
(d) the shield being made from a substance so that the magnetic field will pass therethrough to thus attract and anchor a free end of the tape to the hub, when this free end is brought into the magnetic field, with the tape itself and the magnet band constituting the sole means for anchoring the tape to the hub.

2. The combination as set forth in claim 1;
(e) and in which the magnetic band and the shield are flexible so that they will conform to the diameter of the hub when applied thereto.

3. The combination as set forth in claim 1;
(e) and in which an armature is interposed between the hub and the magnetic band, the armature being flexible so that it will conform to the diameter of the hub when applied thereto.

4. The combination as set forth in claim 1;
(e) and in which the reeled tape, magnetic band and the shield are substantially balanced around the circumference of the hub to thus avoid vibration when the reel is turned about its axis of rotation.

5. In combination, a magnetic sound recording tape of ferrous oxide material, and a self-threading tape recording reel, the latter comprising:
(a) a reel having a hub on which the sound recording tape may be wound;
(b) a permanent magnetic band secured to the hub of the reel;
(c) a protective shield mounted over and covering the magnetic band to protect impressions on the tape from distortion or erasure by the magnetic band;
(d) the shield being made from a substance so that the magnetic field will pass therethrough to thus attract and anchor a free end of the tape to the hub, when this free end is brought into the magnetic field, with the tape itself and the magnet band constituting the sole means for anchoring the tape to the hub;
(e) the magnetic band and the shield being flexible so that they will conform to the diameter of the hub when applied thereto;
(f) an armature interposed between the hub and the magnetic band, the armature being flexible so that it will conform to the diameter of the hub when applied thereto;
(g) and the reeled tape, magnetic band and the shield being substantially balanced around the circumference of the hub to thus avoid vibration when the reel is turned about its axis of rotation.

6. In a self-threading tape recording reel;
(a) a reel having a hub on which a sound recording tape of ferrous oxide material may be wound;

(b) the hub being fashioned with a peripheral notch;
(c) a permanent magnet band secured to the hub to extend substantially therearound, but with the ends of the magnetic band being spaced apart and leaving the peripheral notch of the hub uncovered by the magnetic band;
(d) and a protective shield mounted over and covering the magnetic band to protect impressions on the tape from distortion or erasure by the magnetic band;
(e) the shield comprising a strip made of a substance so that the magnetic field will pass therethrough to thus attract and anchor a free end of the tape to the hub, when this free end is brought into the magnetic field;
(f) the shield strip having an inner end extending through the space between the ends of the magnetic band and being anchored in the peripheral notch of the hub;
(g) the shield strip having sufficient length to provide at least one convolution extending entirely around the hub.

7. In combination, a magnetic sound recording tape of ferrous oxide material, and a self-threading tape recording reel, the latter comprising:
(a) a reel having a hub on which the sound recording tape may be wound;
(b) a permanent magnet band secured to the hub of the reel to extend entirely therearound;
(c) and a protective shield mounted over and covering the entire circumferential area of the magnetic band to protect impressions on the tape from distortion or erasure by the magnetic band;
(d) the shield comprising a strip of a substance so that the magnetic field will pass therethrough to thus attract and anchor a free end of the tape to the hub, when this free end is brought into the magnetic field, with the tape itself and the magnet band constituting the sole means for anchoring the tape to the hub.

References Cited by the Examiner

UNITED STATES PATENTS

| | | | |
|---|---|---|---|
| 2,684,815 | 7/54 | Holz | 242—74 |
| 2,702,673 | 2/55 | Steiner | 242—74 X |
| 2,732,146 | 1/56 | Napolitani | 242—74 |
| 2,958,019 | 10/60 | Scholten et al. | 317—159 |
| 3,051,988 | 9/62 | Baermann | 317—203 |
| 3,124,725 | 3/64 | Leguillon | 317—201 |

References Cited by the Applicant

UNITED STATES PATENTS

| | | |
|---|---|---|
| 1,222,827 | 4/17 | Webster. |
| 1,692,789 | 11/28 | Young. |
| 2,695,140 | 11/54 | Haugaard. |

MERVIN STEIN, *Primary Examiner.*